United States Patent
Chin et al.

(10) Patent No.: US 7,634,183 B2
(45) Date of Patent: Dec. 15, 2009

(54) FOCUS ADJUSTABLE METHOD OF OPTICAL IMAGE

(75) Inventors: Hou-Ching Chin, Taipei (TW); Chih-Chien Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 262 days.

(21) Appl. No.: 11/271,363

(22) Filed: Nov. 10, 2005

(65) Prior Publication Data
US 2007/0071349 A1 Mar. 29, 2007

(30) Foreign Application Priority Data
Sep. 27, 2005 (TW) .............................. 94133456 A

(51) Int. Cl.
*G03B 3/00* (2006.01)
*G03B 13/00* (2006.01)

(52) U.S. Cl. .................. 396/89; 396/104; 396/121; 348/345

(58) Field of Classification Search ........... 396/89–152; 348/345–357; 250/201.2–201.8; 382/255, 382/254
See application file for complete search history.

(56) References Cited

U.S. PATENT DOCUMENTS

| 4,782,474 A | * | 11/1988 | Arai et al. ............... 369/44.14 |
| 5,691,765 A | * | 11/1997 | Schieltz et al. ............ 348/335 |
| 2005/0058030 A1 | * | 3/2005 | Hanks et al. ............ 369/44.29 |

* cited by examiner

*Primary Examiner*—Christopher Mahoney

(57) ABSTRACT

A focus adjustable method of an optical image is implemented by a numerical analysis. An external light beam is allowed to pass through a lens module, thereby generating an optical image. The focus values of the optical image at four corners thereof are computed according to specified formulas to obtain a two-dimensional geometric tilt vector T(X,Y), an image diagonal spinor D and an image tetragonal average value M. According to the values T(X,Y), D and M, the tilt amount and the tilt direction of the lens module are adjusted, the optical quality of the lens module is discriminated and the focus value distribution of the lens module is determined.

10 Claims, 11 Drawing Sheets

|  | UL | UR | DR | DL | X | Y | M | V11 | V12 |
|---|---|---|---|---|---|---|---|---|---|
| L11 | 62 | 30 | 66 | 36 | -0.7 | -2.5 | 48.4 | | |
| L12 | 54 | 48 | 48 | 55 | -3.2 | -0.4 | 51.2 | 2.76 | 5.70% |
| L21 | 54 | 67 | 22 | 50 | -3.9 | 12.3 | 48.5 | | |
| L22 | 71 | 51 | 54 | 70 | -9.1 | -0.3 | 61.7 | 13.21 | 27.27% |
| L31 | 64 | 23 | 70 | 33 | -0.9 | -3.7 | 47.7 | | |
| L32 | 58 | 52 | 51 | 66 | -5.3 | -1.7 | 56.7 | 9.06 | 19.01% |
| L41 | 70 | 59 | 72 | 48 | 3.1 | 2.4 | 62.0 | | |
| L42 | 57 | 66 | 69 | 60 | 4.4 | -1.5 | 63.0 | 1.04 | 1.67% |
| L51 | 66 | 69 | 68 | 66 | 1.4 | 0.0 | 67.2 | | |
| L52 | 66 | 69 | 68 | 66 | 1.4 | 0.0 | 67.2 | 0 | 0% |

Fig.7

FOCUS ADJUSTABLE METHOD OF OPTICAL IMAGE

FIELD OF THE INVENTION

The present invention relates to a focus adjustable method of an optical image, and more particularly to an automatic focus adjustable method of an optical image by performing a numerical analysis on the focus values at four corners of the optical image.

BACKGROUND OF THE INVENTION

Currently, an optical lens module is widely used in an electronic product such as a videophone or a mobile phone's camera. In order to adjust, calibrate or detect the focusing operations of the optical lens module, the workers may manually rotate the optical lens module, which is engaged with a lens holding jag having an image sensor therein, to have the lens module rotate up and down along the lens' axis.

Referring to FIG. 1, a conventional focus adjustable system for generating an optical image having four corners' focus values is illustrated. In the focus adjustable system 10 of FIG. 1, an external light beam 11 passes through a lens surface 121 of a lens module 12, and is then projected onto an image sensor 14 equipped in a lens holding jag 13. After the light beam is imaged on the image sensor 14, an optical image I1 is outputted to a microprocessor 15. By a so-called full screen algorithm or a modulation transfer function (MTF) algorithm, the focus values UL1, UR1, DL1 and DR1 of the optical image I1 at four corners thereof are obtained. The external surface of the lens module 12 has a first engaging element (e.g. a screw thread) matching with the second engaging element 131 (e.g. a screw channel) on the inner surface of the lens holding jag 13, so that the lens module 12 may be rotated along the inner surface of the lens holding jag 13 forwardly or backwardly. As known, the first and second engaging elements may have any complementary structures as long as they match with each other, and are not to be redundantly described herein.

Referring to FIGS. 2(a) and 2(b), four original corners' focus values before the focus adjustment and four adjusted corners' focus values after the focus adjustment are respectively shown. In FIG. 2(a), the original focus values UL1, UR1, DL1 and DR1 before the focus adjustment are 45, 45, 45 and 45, respectively. In general, the focusing performance is proportioned to the focus value. That is to say, a lower focus value, e.g. 45, indicates the undesirable focusing performance. In order to the adjust the focus values, the worker may manually rotate the lens module 12, which is engaged with the lens holding jag 13, along the X-axis direction, i.e. the lens axis direction. After the focus values UL1, UR1, DL1 and DR1 are increased and reach acceptable values as shown in FIG. 2(b), e.g. 55 or above, the focusing performance of the lens module 12 is improved.

Unfortunately, during the focus adjusting process, the lens module 12 and/or the image sensor 14 is readily tilted. Under this circumstance, the optical path between the lens module 12 and the image sensor 14 will also be tilted. As shown in FIG. 2(c), due to this tilt phenomenon, the focus values UL1, UR1, DL1 and DR1 are changed to for example 50, 45, 30 and 41, respectively, which are not evenly distributed. Since these focus values are not evenly distributed, even if the worker manually rotates the lens module 12 along the X-axis direction, the adjusted focus values are still unevenly distributed. As known, this unsuccessful focusing adjustment may be caused by a fact that the lens holding jag 13 can move only along the X-axis direction. Moreover, since the tilt amount and the tilt angle are not clearly realized according to the prior art, the problem of generating uneven focus values is hard to be overcome.

In addition to the undesired tilted lens module 12 or image sensor 14, the inherent imaging tolerance of the lens module 12 during fabrication also contributes to a tilted optical path. The conventional focus adjustable method fails to discriminate whether the inherent imaging tolerance influences the focusing performance. Furthermore, the conventional focus adjustable method fails to evaluate the overall focusing performance after the lens module 12 is adjusted.

In views of the above-described disadvantages, the applicant keeps on carving unflaggingly to develop an improved focus adjustable method according to the present invention through wholehearted experience and research.

SUMMARY OF THE INVENTION

It is an object of the present invention to provide a focus adjustable method of an optical image according to the tilt amount and the tilt direction of the lens module to perform two-dimensional focusing adjustment, so that the focusing performance of the optical image is enhanced.

Another object of the present invention provides a focus adjustable method of an optical image for discriminating the actual cause of the focusing errors.

A still object of the present invention provides a focus adjustable method of an optical image, which is capable evaluating the focusing performance.

In accordance with a first aspect of the present invention, there is provided a focus adjustable method comprising steps of allowing an external light beam to pass through a lens module, thereby generating an optical image; obtaining focus values UR, UL, DR and DL of the optical image at four corners thereof; performing a first image analysis procedure to obtain a two-dimensional geometric tilt vector T(X,Y) according to the formula: $T(X,Y)=(X^2+Y^2)^{1/2}, \angle \arctan(Y/X)$, where $X=[(DR+UR)-(UL+DL)]/b$, $Y=[(UR+UL)-(DR+DL)]/a$, and a and b are correction factors for correcting the aspect ratio; and correcting the tilt phenomenon of the lens module according to the two-dimensional geometric tilt vector T(X,Y) so as to achieve a more uniform focusing effect of the optical image.

Preferably, a=3 and b=4, or a=4 and b=3.

In an embodiment, the focus adjustable method further comprises steps of performing a second image analysis procedure to obtain an image diagonal spinor D according to the formula: $D=(DR+UL)-(UR+DL)$; and determining optical systematic errors of the lens module according to the image diagonal spinor D.

In an embodiment, the focus adjustable method further comprises steps of performing a third image analysis procedure to obtain an image tetragonal average value M according to the formula: $M=(DR+UL+UR+DL)$; and discriminating whether the focus value distribution of the optical image is optimized after the focus adjustment according to the image tetragonal average value M.

Preferably, $X=[(DR+UR)-(UL+DL)]/(4\times b)$, $Y=[(UR+UL)-(DR+DL)]/(4\times a)$, $M=(DR+UL+UR+DL)/4$ or $D=(DR+UL)-(UR+DL)/4$.

In accordance with a second aspect of the present invention, there is provided a focus adjustable method comprising steps of allowing an external light beam to pass through a lens module, thereby generating an optical image; obtaining focus values UR, UL, DR and DL of the optical image at four corners thereof; performing a first image analysis procedure to obtain an image diagonal spinor D according to the formula: D=(DR+UL)−(UR+DL); and determining optical systematic errors of the lens module according to the image diagonal spinor D.

In an embodiment, the focus adjustable method further comprises steps of performing a second image analysis procedure to obtain a two-dimensional geometric tilt vector T(X, Y) according to the formula: $T(X,Y)=(X^2+Y^2)^{1/2}$, ∠arctan (Y/X), where X=[(DR+UR)−(UL+DL)]/b, Y=[(UR+UL)−(DR+DL)]/a, and a and b are correction factors for correcting the aspect ratio; and correcting the tilt phenomenon of the lens module according to the two-dimensional geometric tilt vector T(X,Y) so as to achieve a more uniform focusing effect of the optical image.

In an embodiment, the focus adjustable method further comprises steps of performing a third image analysis procedure to obtain an image tetragonal average value M according to the formula: M=(DR+UL+UR+DL); and discriminating whether the focus value distribution of the optical image is optimized after the focus adjustment according to the image tetragonal average value M.

In accordance with a third aspect of the present invention, there is provided a focus adjustable method, comprising steps of allowing an external light beam to pass through a lens module, thereby generating an optical image; obtaining focus values UR, UL, DR and DL of the optical image at four corners thereof; performing a first image analysis procedure to obtain an image tetragonal average value M according to the formula: M=(DR+UL+UR+DL); and discriminating whether the focus value distribution of the optical image is optimized after the focus adjustment according to the image tetragonal average value M.

In an embodiment, the focus adjustable method further comprises steps of performing a second image analysis procedure to obtain a two-dimensional geometric tilt vector T(X, Y) according to the formula: $T(X,Y)=(X^2+Y^2)^{1/2}$, ∠ arctan (Y/X), where X=[(DR+UR)−(UL+DL)]/b, Y=[(UR+UL)−(DR+DL)]/a, and a and b are correction factors for correcting the aspect ratio; and correcting the tilt phenomenon of the lens module according to the two-dimensional geometric tilt vector T(X,Y) so as to achieve a more uniform focusing effect of the optical image.

In an embodiment, the focus adjustable method further comprises steps of performing a third image analysis procedure to obtain an image tetragonal average value M according to the formula: M=(DR+UL+UR+DL); and discriminating whether the focus value distribution of the optical image after the focus adjustment is optimized according to the image tetragonal average value M.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 7 illustrates a comparison table related to the focus adjusting performance of five lens modules before and after focus adjustment.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
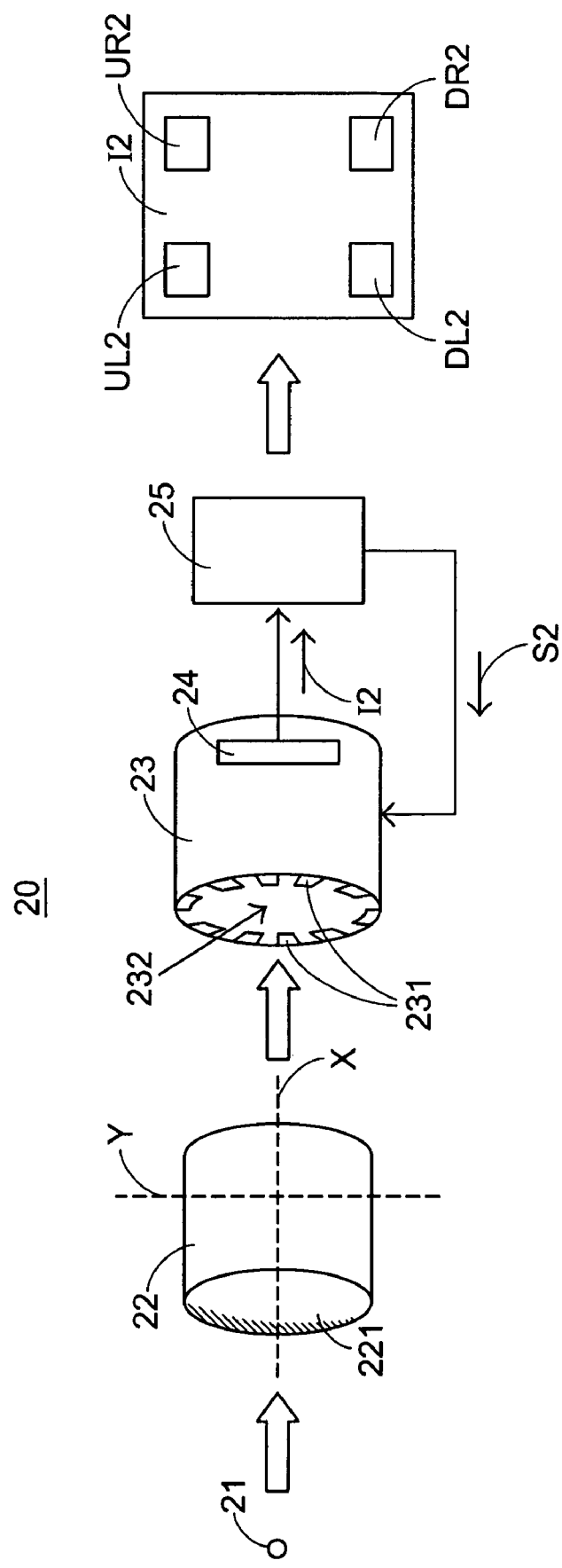
FIG. 3 is a schematic view illustrating a focus adjustable system for generating an optical image having four corners' focus values according to the present invention.

Referring to FIG. 3, a focus adjustable system for generating an optical image having four corners' focus values according to the present invention is illustrated. In the focus adjustable system 20 of FIG. 3, an external light beam 21 passes through a lens surface 221 of a lens module 22, and is then projected onto an image sensor 24 equipped in a lens holding jag 23. After the light beam is imaged on the image sensor 24, an optical image I2 is outputted to a microprocessor 25. By a so-called full screen algorithm or a modulation transfer function (MTF) algorithm, the focus values UL2, UR2, DL2 and DR2 of the optical image I2 at four corners thereof are obtained. Several sustaining elements 231 are protruded from the inner surface of the lens holding jag 23 to define a receptacle 232 between these sustaining elements 231. The lens module 22 is accommodated within the receptacle 232. By controlling the sustaining force applied onto the sustaining elements 231, a tiny shift of the lens module 22 in two dimensions is achievable. The operation principle of controlling the sustaining force applied onto the sustaining elements 231 and the structures of the sustaining elements 231 are similar to those described in the art, and are not to be redundantly described herein. For example, the sustaining force is controlled in response to a shift control signal S2 as shown in FIG. 3 or manually controlled by a resilient element (not shown).

According to present invention, the focus values UL2, UR2, DL2 and DR2 are computed by the microprocessor 25 to obtain a two-dimensional geometric tilt vector T(X,Y), an image diagonal spinor D and an image tetragonal average value M. According to the values T(X,Y), D and M, the tilt angle and the tilt direction of the lens module 22 and the causes of titled phenomenon are precisely realized, thereby further controlling the sustaining element 231 and the tiny shift of the lens module 22.

Figure 4:
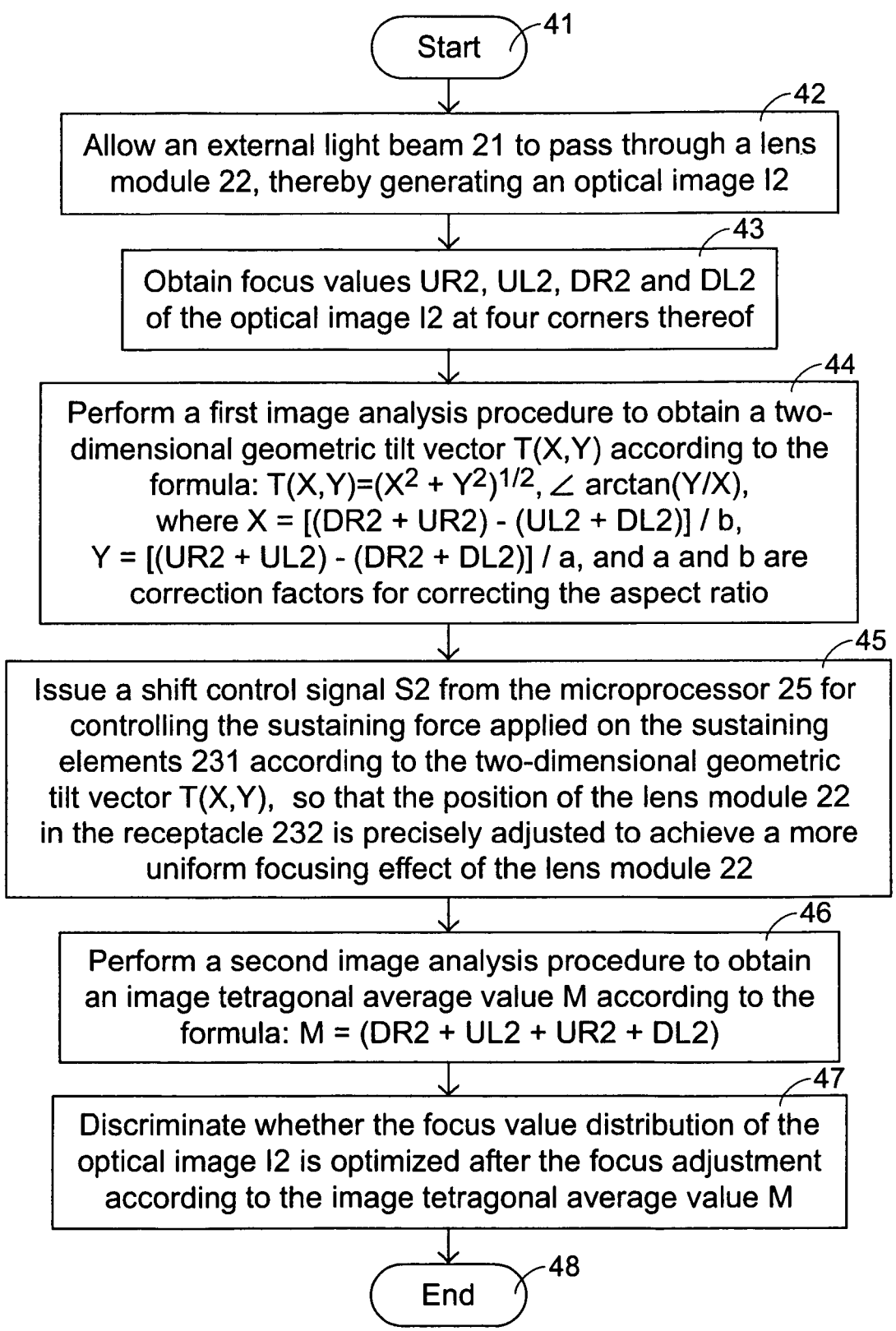
FIG. 4 is a flowchart illustrating a focus adjustable method according to a first preferred embodiment of the present invention.

Hereinafter, the process for executing an automatic focus adjustable method according to a first preferred embodiment of the present invention is illustrated with reference to the flowchart of FIG. 4. In this embodiment, the two-dimensional geometric tilt vector T(X,Y) and the image tetragonal average value M are employed. As previously described, the optical errors are resulted from inherent imaging tolerance of the lens module 12 during fabrication or the assembling tolerance of the stilted lens module 12 or image sensor 14. In this embodiment, the actual causes of the optical errors will not be discussed herein.

After the starting step (Step 41), an external light beam 21 is allowed to pass through the lens module 22, thereby generating the optical image I2 (Step 42).

In Step 43, the focus values UL2, UR2, DL2 and DR2 of the optical image I2 at four corners thereof are obtained.

Then, in Step 44, a first image analysis procedure is performed to obtain a two-dimensional geometric tilt vector T(X,Y) according to the formula: $T(X,Y)=(X^2+Y^2)^{1/2}$, $\angle$ arctan(Y/X), where X=[(DR2+UR2)−(UL2+DL2)]/b, Y=[(UR2+UL2)−(DR2+DL2)]/a, and a and b are correction factors for correcting the aspect ratio. According to the above formula related to the two-dimensional geometric tilt vector T(X,Y), the tilt amount and the tilt angle of the lens module 22 are $(X^2+Y^2)^{1/2}$ and arctan(Y/X), respectively. These data are helpful for providing even focus values upon the further automatic adjustment of the lens module 22. Preferably, a=3 and b=4, or a=4 and b=3. Especially, X=[(DR2+UR2)−(UL2+DL2)]/(4×b), and Y=[(UR2+UL2)−(DR2+DL2)]/(4×a).

Figure 1:
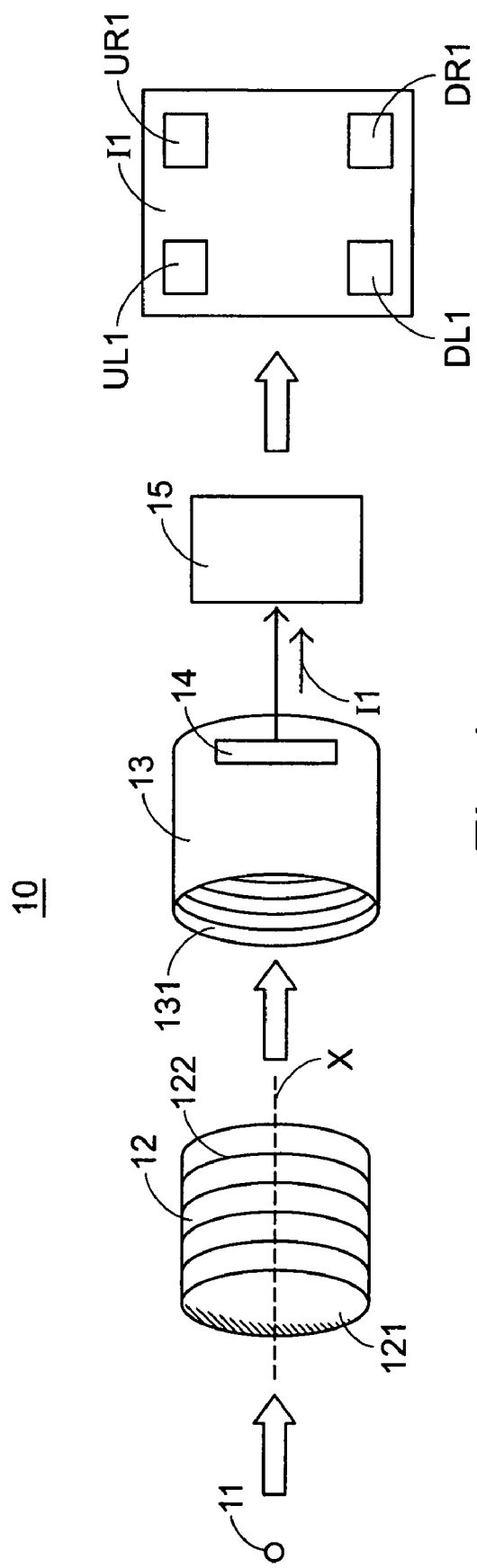
FIG. 1 is a schematic view illustrating a conventional focus adjustable system for generating an optical image having four corners' focus values.
Figure 2A:
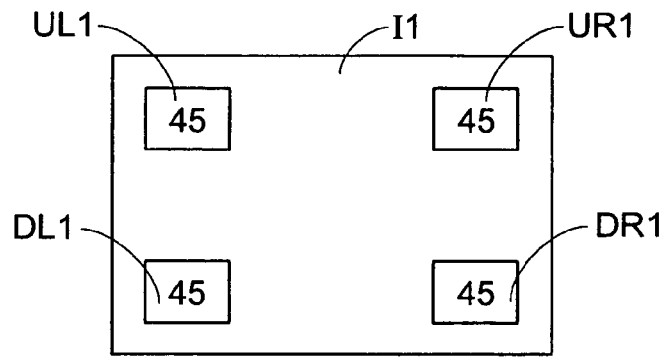
FIGS. 2(a) and 2(b) illustrate four original corners' focus values before the focus adjustment and four adjusted corners' focus values after the focus adjustment, respectively, according to prior art.
Figure 2B:
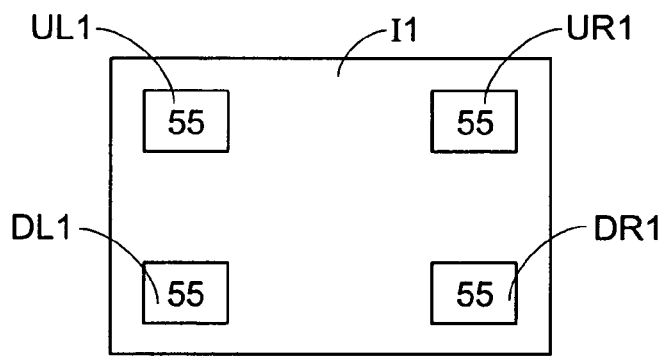
Figure 2C:
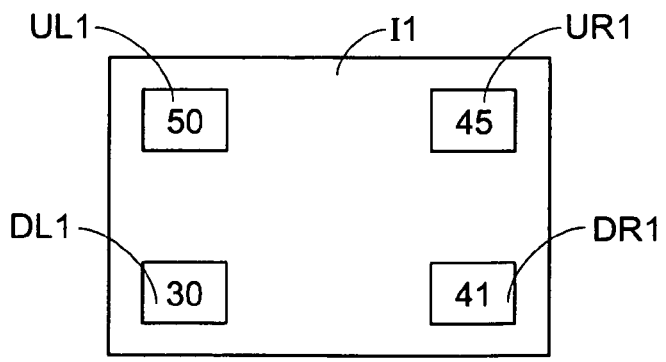
FIG. 2(c) illustrates four unevenly distributed corners' focus values due to a tilted lens module or image sensor according to prior art.

For example, as previously described, the corners' focus values UL1, UR1, DL1 and DR1 of the optical image I1 shown in FIG. 2(c) are 50, 45, 30 and 41, respectively. According to the above formula described in Step 44, where a=b=1, the values X=6 and Y=1.5 are obtained. In addition, the tilt amount and the tilt angle of the lens module 22 are 24.73 and 1.33°, respectively.

In Step 45, according to the two-dimensional geometric tilt vector T(X,Y), a shift control signal S2 is automatically issued from the microprocessor 25 for controlling the sustaining force applied on the sustaining elements 231. Therefore, the position of the lens module 22 in the receptacle 232 is precisely adjusted to achieve a more uniform focusing effect of the lens module 22.

Then, in Step 46, a second image analysis procedure is performed to obtain an image tetragonal average value M according to the formula: M=(DR2+UL2+UR2+DL2), or especially M=(DR2+UL2+UR2+DL2)/4.

According to the image tetragonal average value M, the microprocessor 25 may discriminate whether the focus value distribution of the optical image I2 is optimized after the focus adjustment (Step 47). Meanwhile, the focus adjustable method is completed (Step 48).

Figure 5A:
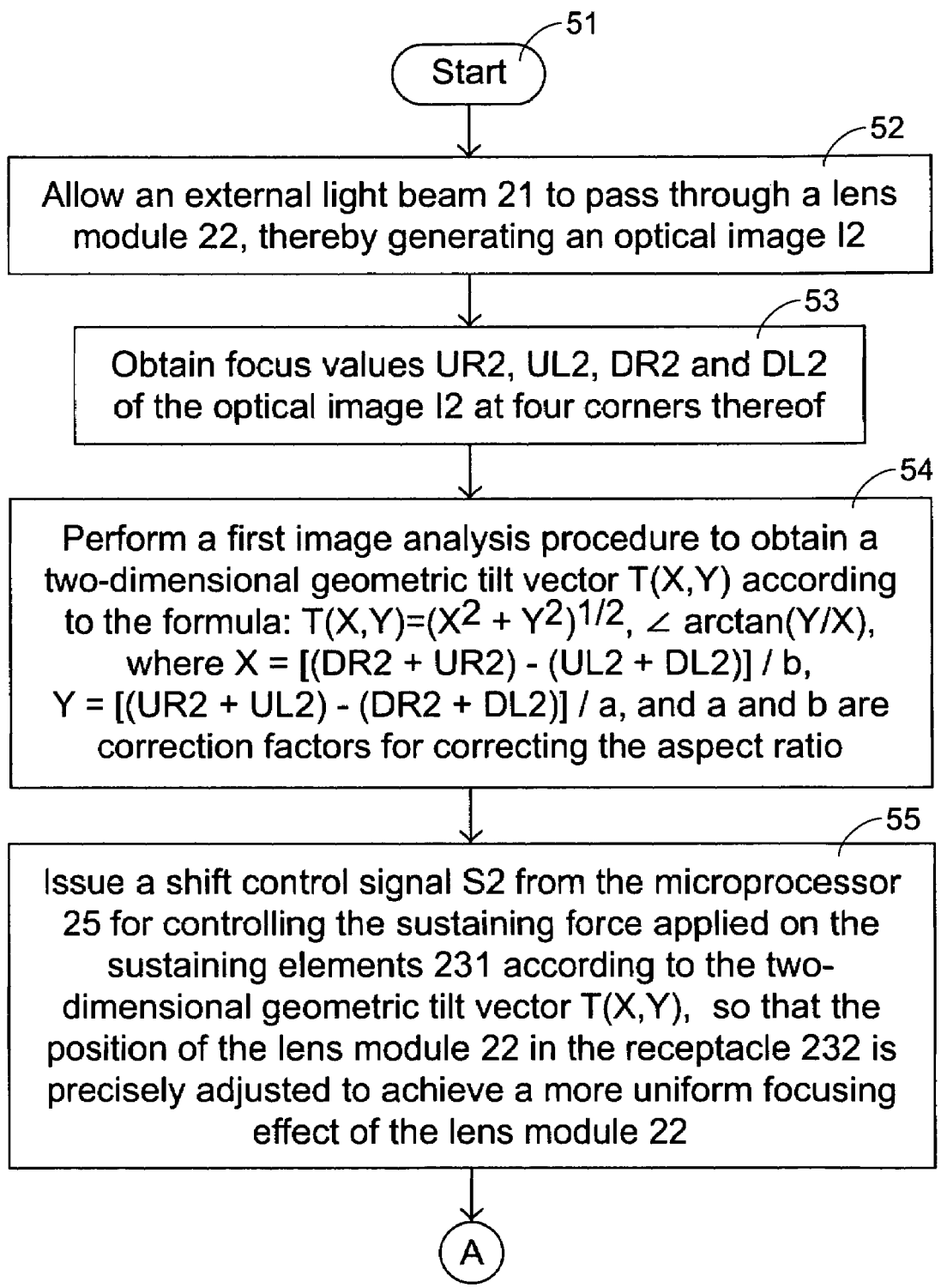
FIGS. 5(a) and 5(b) are a flowchart illustrating a focus adjustable method according to a second preferred embodiment of the present invention.
Figure 5B:
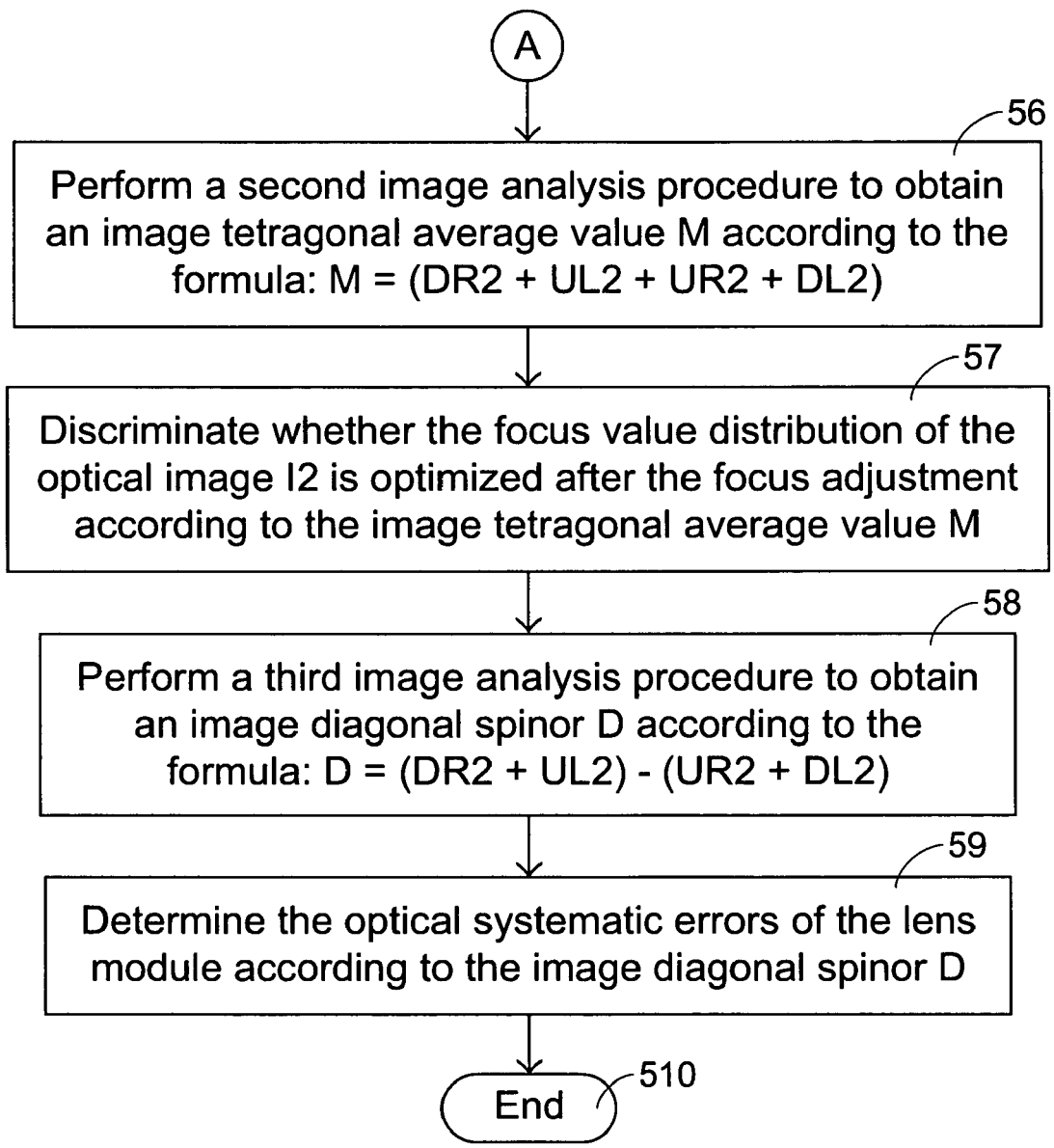

Hereinafter, the process for executing an automatic focus adjustable method according to a second preferred embodiment of the present invention is illustrated with reference to the flowchart of FIGS. 5(a) and 5(b). In this embodiment, the actual causes of the optical errors can be automatically identified.

After the starting step (Step 51), an external light beam 21 is allowed to pass through the lens module 22, thereby generating the optical image I2 (Step 52).

In Step 53, the focus values UL2, UR2, DL2 and DR2 of the optical image I2 at four corners thereof are obtained.

Then, in Step 54, a first image analysis procedure is performed to obtain a two-dimensional geometric tilt vector T(X,Y) according to the formula: $T(X,Y)=(X^2+Y^2)^{1/2}$, $\angle$arctan(Y/X), where X=[(DR2+UR2)−(UL2+DL2)]/b, Y=[(UR2+UL2)−(DR2+DL2)]/a, and a and b are correction factors for correcting the aspect ratio. According to the above formula related to the two-dimensional geometric tilt vector T(X,Y), the tilt amount and the tilt angle of the lens module 22 are $(X^2+Y^2)^{1/2}$ and arctan(Y/X), respectively. These data are helpful for providing even focus values upon the further automatic adjustment of the lens module 22. Preferably, a=3 and b=4, or a=4 and b=3. Especially, X=[(DR2+UR2)−(UL2+DL2)]/(4×b), and Y=[(UR2+UL2)−(DR2+DL2)]/(4×a).

In Step 55, a shift control signal S2 is automatically issued from the microprocessor 25 for controlling the sustaining force applied on the sustaining elements 231. Therefore, the position of the lens module 22 in the receptacle 232 is precisely adjusted to achieve a more uniform focusing effect of the lens module 22.

Then, in Step 56, a second image analysis procedure is performed to obtain an image tetragonal average value M according to the formula: M=(DR2+UL2+UR2+DL2), or especially M=(DR2+UL2+UR2+DL2)/4.

According to the image tetragonal average value M, the microprocessor 25 may discriminate whether the focus value distribution of the optical image I2 is optimized after the focus adjustment (Step 57).

Then, in Step 58, a third image analysis procedure is performed to obtain an image diagonal spinor D according to the formula: D=(DR2+UL2)−(UR2+DL2), or especially D=(DR2+UL2)−(UR2+DL2)/4.

According to the image diagonal spinor D, the microprocessor 25 may determine the optical systematic errors of the lens module (Step 59). Meanwhile, the focus adjustable method is completed (Step 510).

The focus adjustable method described in the second preferred embodiment of the present invention is capable of correcting the tilt phenomenon of the lens module due to assembling tolerance. In addition, the focus adjustable method of the second preferred embodiment can further avoid erroneously judging focusing performance of the lens module, as will be described in FIGS. 6(a) and 6(b).

Figure 6B:
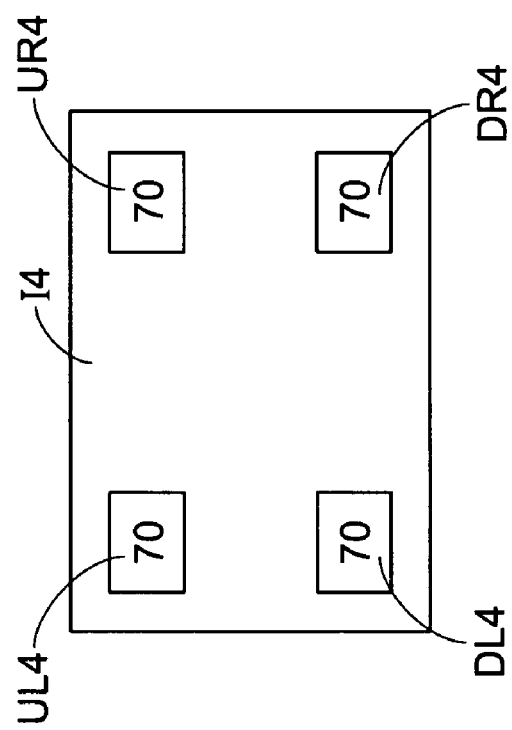
FIGS. 6(a) and 6(b) schematically illustrate two optical images I3 and I4 generated from different lens modules after the first image analysis procedures are performed according to the focus adjustable method described in the second embodiment, respectively.
Figure 6A:
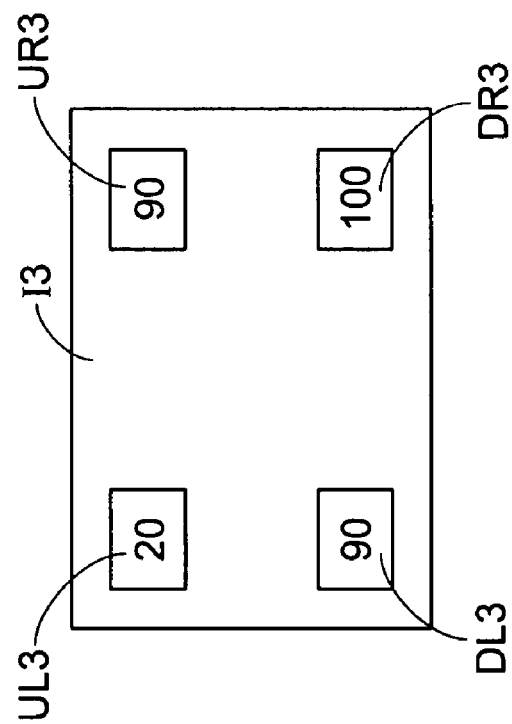

FIGS. 6(a) and 6(b) schematically illustrate two optical images I3 and I4 generated from different lens modules after the first image analysis procedures are performed according to the focus adjustable method described in the second embodiment, respectively.

For the optical image I3 and I4, the second image analysis procedures are performed to obtain image tetragonal average values M of 300 and 280, respectively. From the image tetragonal average values, the focusing performance of the lens module to generate the optical image I3 is better than the lens module to generate the optical image I4. However, when the four corners' focus values of the optical image I3, i.e. (UR3, UL3, DR3, DL3) are compared with the four corners' focus values of the optical image I4, i.e. (UR4, UL4, DR4, DL4), it is found that the corners' focus values of the optical image I3 is not uniformly distributed. Therefore, after the second image analysis procedures are performed on the optical images I3 and I4 as described in the second embodiment of the present invention, the variance resulted from the uneven focus values is readily observed. In other words, the lens module to generate the optical image I3 has optical systematic errors. Whereas, the lens module to generate the optical image I4 has superior optical performance.

The focus adjusting performance according to the first or second embodiment of the present invention will be further understood with reference to a comparison table as shown in FIG. 7.

In the table of FIG. 7, five lens modules are used to implement the focus adjustable tests. The terms L11 and L12 used herein indicate the first lens module before focus adjustment and the first lens module after focus adjustment, respectively. The terms UL, UR, DR and DL are the four corners' focus values of the designated lens module. The values X and Y and the image tetragonal average value M are calculated according to the related formulas described in the first or second embodiments of the present invention. The term V11 indicates a difference between the image tetragonal average value M after focus adjustment and the image tetragonal average value M before focus adjustment for the designated lens module. Whereas, the term V12 is the percentage of the difference. Likewise, the terms L21 and L22 used herein indicate the second lens module before focus adjustment and the second lens module after focus adjustment, respectively. The rest (L31, L32), (L41, L42) and (L51, L52) may be deduced by analogy.

For example the second lens module for example. The four corners' focus values of the optical image before focus adjustment are 54, 67, 22 and 50, respectively. According to the above formula as described in the first or second embodiment, the values X and Y calculated by the microprocessor 25 (as shown in FIG. 3) after the first image analysis procedure are −3.9 and 2.3, respectively. Moreover, according to the values X and Y, the tilt amount and tilt direction of the second lens module will be realized. After the second image analysis procedure as described in the first or second embodiment, the image tetragonal average value M for the second lens module is 48.5.

According to the related values, e.g. the four corners' focus values, the calculated tilt amount and tilt direction, the microprocessor 25 may determine whether the focus adjustment is required. In order to perform the focus adjustment, according to the tilt amount and the tilt direction, a shift control signal S2 is automatically issued from the microprocessor 25 for controlling the sustaining force applied on the sustaining elements 231. Therefore, the position of the lens module 22 in the receptacle 232 is precisely adjusted to achieve a more uniform focusing effect of the lens module 22.

In another case that the second lens module is used and the four corners' focus values of the optical image are 71, 51, 54 and 70, respectively, the values X and Y calculated by the microprocessor 25 are −9.1 and −0.3, respectively. After the second image analysis procedure, the image tetragonal average value M for the second lens module is 61.7. The difference V11 and the difference percentage V12 for the second lens module are 13.21 and 27.27%, respectively. It is found that the focus values of the optical image for the second lens module after focus adjustment are more uniformly distributed and the image tetragonal average value M is changed from 48.5 to 61.6. Accordingly, the focusing performance of the second lens module is improved after the focus adjustment.

For the fifth lens module, the four corners' focus values of the optical image are 66, 69, 68 and 66, respectively. Since these focus values are uniformly distributed and the image tetragonal average value M reaches an acceptable value, i.e. 67.2, the microprocessor 25 may discriminate that no focus adjustment is required.

Figure 8:
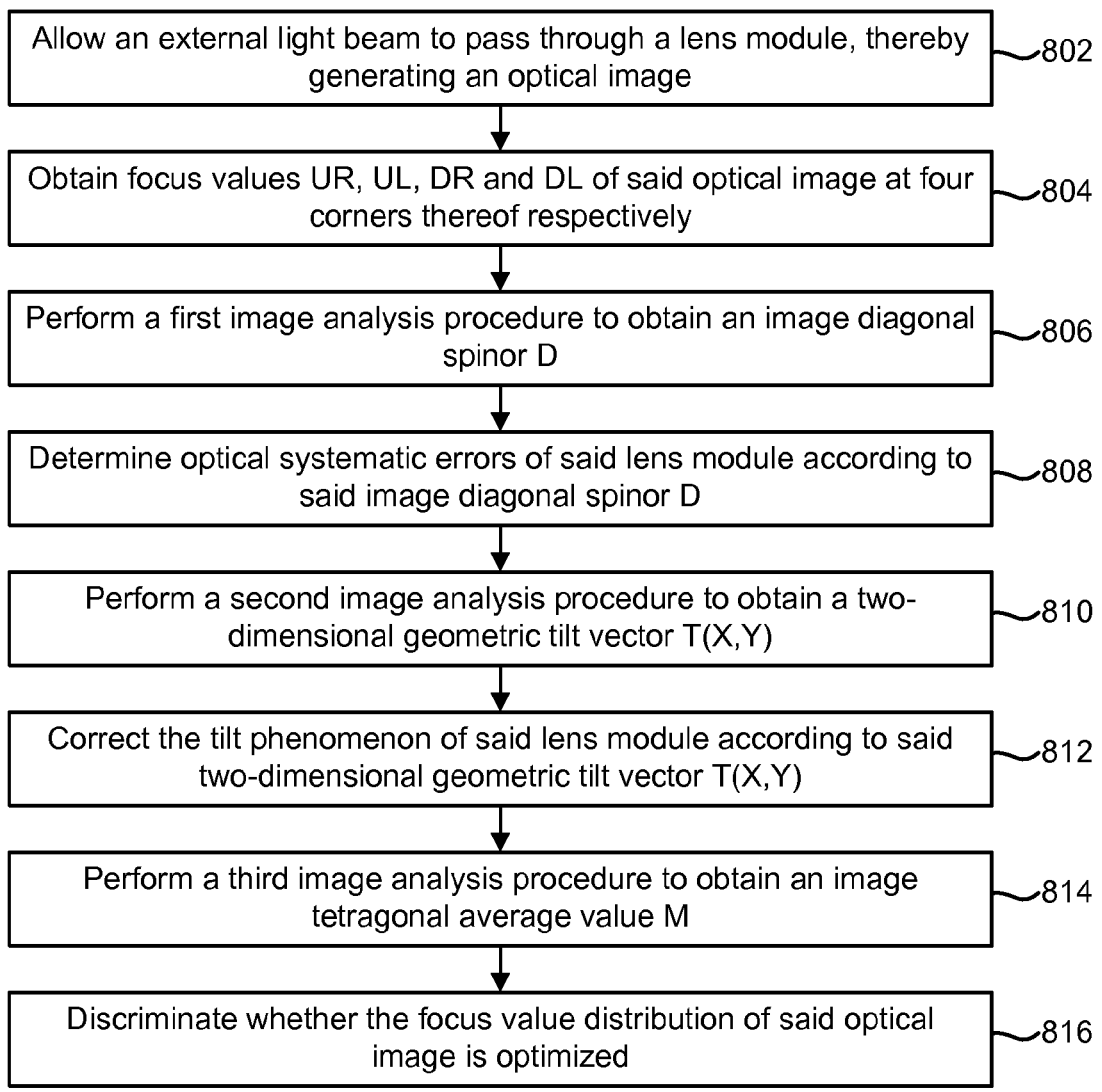
FIG. 8 illustrates a focus adjustable method.

FIG. 8 illustrates a focus adjustable method 800. The method 800 includes allowing 802 an external light beam to pass through a lens module, thereby generating an optical image. The method 800 also includes obtaining 804 focus values UR, UL, DR and DL of said optical image at four corners thereof respectively. The method 800 also includes performing 806 a first image analysis procedure to obtain an image diagonal spinor D according to one of the formulas: D=(DR +UL)−(UR+DL) or D=(DR+UL)−(UR+DL)/4. The method 800 also includes determining 808 optical systematic errors of said lens module according to said image diagonal spinor D. The method 800 also includes performing 810 a second image analysis procedure to obtain a two-dimensional geometric tilt vector T(X,Y) according to the formulas: T(X,Y)=$(X^2+Y^2)^{1/2}$, ∠arctan(Y/X), where X=[(DR+UR)−(UL+DL)]/b, Y=[(UR+UL)−(DR +DL)]/a, or X =[(DR+UR)(UL+DL)]/(4×b), Y=[(UR+UL)−(DR+DL)]/(4×a), where a and b are correction factors for correcting the aspect ratio of said lens module. The method 800 also includes correcting 812 the tilt phenomenon of said lens module according to said two-dimensional geometric tilt vector T(X,Y) so as to achieve a more uniform focusing effect of said optical image. The method 800 also includes performing 814 a third image analysis procedure to obtain an image tetragonal average value M according to one of the formulas: M=(DR+UL+UR+DL), or M=(DR+UL+UR+DL)/4 or D=(DR+UL)−(UR+DL)/4. The method 800 also includes discriminating 816 whether the focus value distribution of said optical image is optimized according to said image tetragonal average value M.

Figure 9:
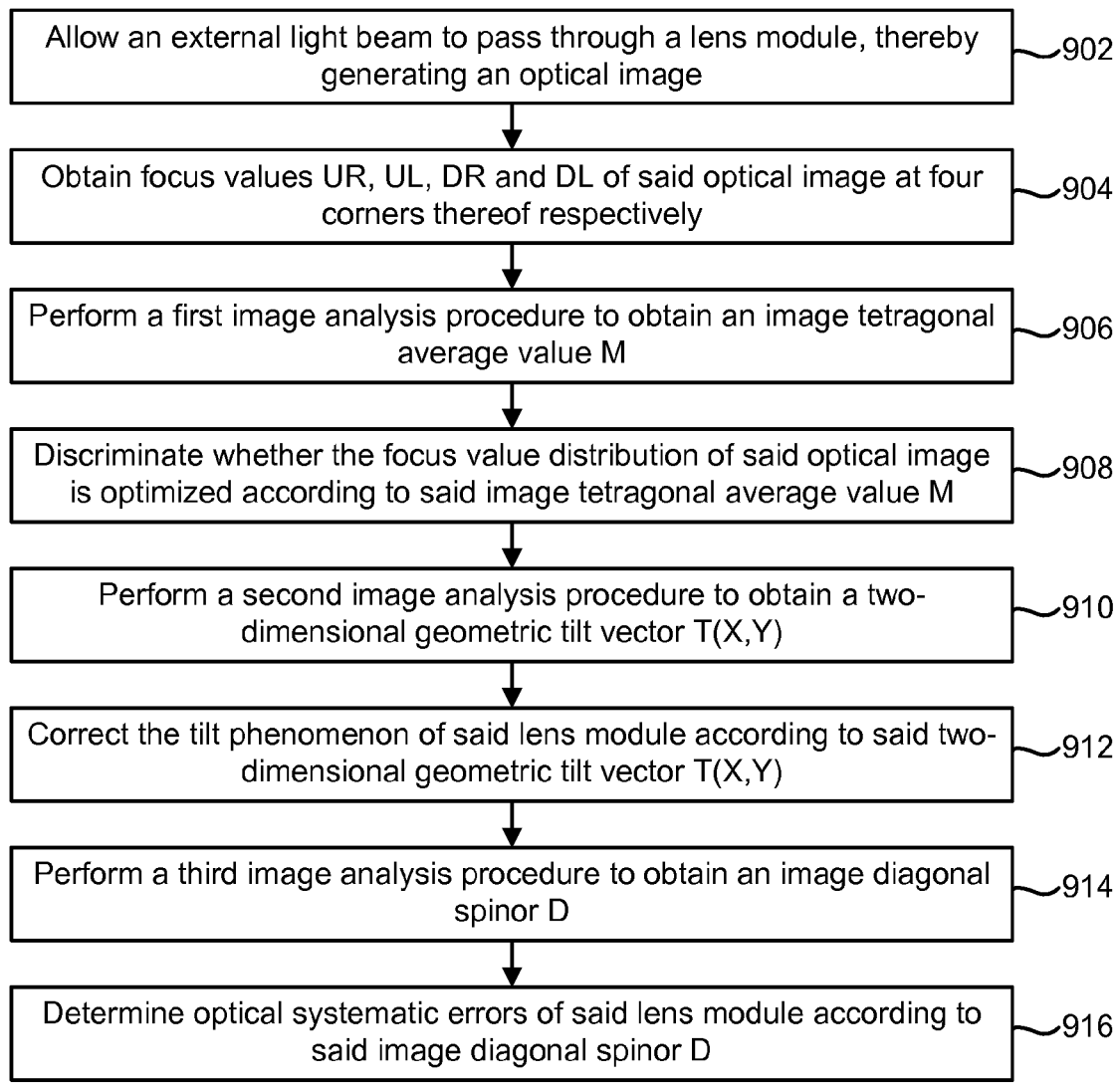
FIG. 9 illustrates another focus adjustable method.

FIG. 9 illustrates another focus adjustable method 900. The method 900 includes allowing 902 an external light beam to pass through a lens module, thereby generating an optical image. The method 900 also includes obtaining 904 focus values UR, UL, DR and DL of said optical image at four corners thereof respectively. The method 900 also includes performing 906 a first image analysis procedure to obtain an image tetragonal average value M according to one of the formulas: M=(DR+UL+UR+DL) or M=(DR+UL+UR+DL)/4. The method 900 also includes discriminating 908 whether the focus value distribution of said optical image is optimized according to said image tetragonal average value M. The method 900 also includes performing 910 a second image analysis procedure to obtain a two-dimensional geometric tilt vector T(X,Y) according to the formulas: T(X,Y)=$(X^2+Y^2)^{1/2}$, ∠arctan(Y/X), where X=[(DR +UR)−(UL+DL)]/b, Y=[(UR+UL)−(DR+DL)]/a, or X=[(DR+UR)(UL+DL)]/(4×b), Y=[(UR +UL)−(DR+DL)]/ (4×a), where a and b are correction factors for correcting the aspect ratio of said lens module. The method 900 also includes correcting 912 the tilt phenomenon of said lens module according to said two-dimensional geometric tilt vector T(X,Y) so as to achieve a more uniform focusing effect of said optical image. The method 900 also includes performing 914 a third image analysis procedure to obtain an image diagonal spinor D according to one of the formulas: D=(DR+UL)−(UR+DL) or D=(DR+UL)−(UR+DL)/4. The method 900 also includes determining 916 optical systematic errors of said lens module according to said image diagonal spinor D.

Figure 10:
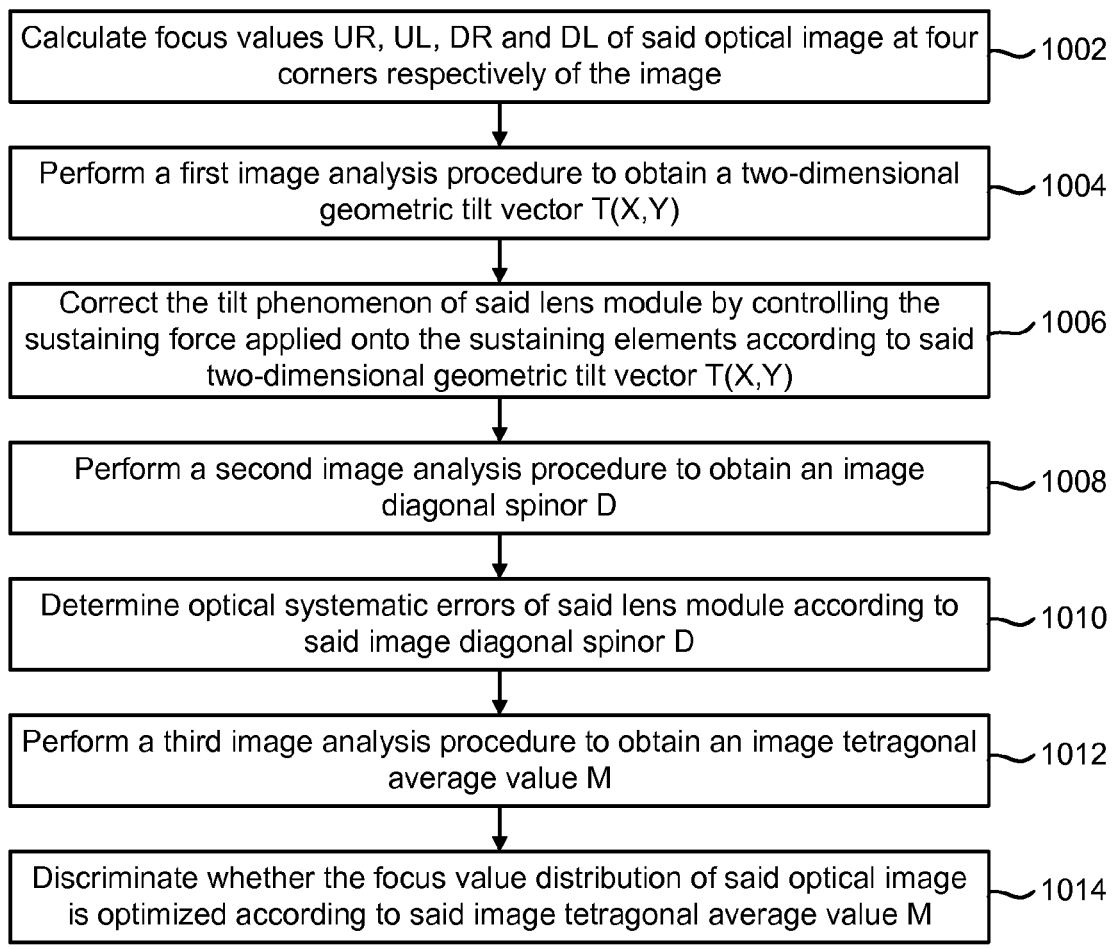
FIG. 10 illustrates another focus adjustable method.

FIG. 10 illustrates another focus adjustable method 1000. The method 1000 maybe performed by the microprocessor 15. The method 1000 includes calculating 1002 focus values UR, UL, DR and DL of said optical image at four corners respectively of the image. The method 1000 also includes performing 1004 a first image analysis procedure to obtain a two-dimensional geometric tilt vector T(X,Y) according to the formulas: T(X,Y)=$(X^2+Y^2)^{1/2}$, ∠arctan(Y/X), where X = [(DR+UR)−(UL+DL)]/b, Y=[(UR+UL)−(DR+DL)]/a, or X =[(DR+UR)−(UL+DL)]/ (4×b), Y=[(UR+UL)−(DR+DL)]/(4×a), where a and b are correction factors for correcting an aspect ratio of the lens module. The method 1000 also includes correcting 1006 the tilt phenomenon of said lens module by controlling the sustaining force applied onto the sustaining elements according to said two-dimensional geometric tilt vector T(X,Y) so as to achieve a more uniform focusing effect of said optical image. The method 1000 also includes performing 1008 a second image analysis procedure to obtain an image diagonal spinor D according to one of the formulas:D=(DR+UL)−(UR+DL) or D=(DR+UL)−(UR+DL)/4. The method 1000 also includes determining 1010 optical systematic errors of said lens module according to said image diagonal spinor D. The method 1000 also includes performing 1012 a third image analysis procedure to obtain an image tetragonal average value M according to one of the formulas: M=(DR+UL+UR +DL) or M=(DR+UL+UR+DL)/

What is claimed is:

1. A focus adjustable method, comprising steps of:
    allowing an external light beam to pass through a lens module, thereby generating an optical image;
    obtaining focus values UR, UL, DR and DL of said optical image at four corners thereof respectively;
    performing a first image analysis procedure to obtain an image diagonal spinor D according to one of the formulas: D=(DR+UL)−(UR+DL) or D=(DR+UL)−(UR+DL)/4;
    determining optical systematic errors of said lens module according to said image diagonal spinor D;
    performing a second image analysis procedure to obtain a two-dimensional geometric tilt vector T(X,Y) according to the formulas: $T(X,Y)=(X^2+Y^2)^{1/2}$, ∠ arctan(Y/X), where X=[(DR+UR)−(UL+DL)]/b, Y=[(UR+UL)−(DR+DL)]/a, or X=[(DR+UR)(UL+DL)]/(4×b), Y=[(UR+UL)−(DR+DL)]/(4×a), and a and b are correction factors for correcting an aspect ratio of said lens module; and
    correcting a tilt phenomenon of said lens module according to said two-dimensional geometric tilt vector T(X,Y) so as to achieve a more uniform focusing effect of said optical image.

2. The focus adjustable method according to claim 1 wherein a=3 and b=4, or a=4 and b=3.

3. The focus adjustable method according to claim 1 further comprising steps of:
    performing a third image analysis procedure to obtain an image tetragonal average value M according to one of the formulas: M=(DR+UL+UR+DL), or M=(DR+UL+UR+DL)/4 or M=(DR+UL)−(UR+DL)/4; and
    discriminating whether a focus value distribution of said optical image is optimized according to said image tetragonal average value M.

4. A focus adjustable method, comprising steps of:
    allowing an external light beam to pass through a lens module, thereby generating an optical image;
    obtaining focus values UR, UL, DR and DL of said optical image at four corners thereof respectively;
    performing a first image analysis procedure to obtain an image tetragonal average value M according to one of the formulas: M=(DR+UL+UR+DL) or M=(DR+UL+UR+DL)/4;
    discriminating whether a focus value distribution of said optical image is optimized according to said image tetragonal average value M;
    performing a second image analysis procedure to obtain a two-dimensional geometric tilt vector T(X,Y) according to the formulas: $T(X,Y)=(X^2+Y^2)^{1/2}$, ∠ arctan(Y/X), where X=[(DR+UR)−(UL+DL)]/b, Y=[(UR+UL)−(DR+DL)]/a, or X=[(DR+UR)(UL+DL)]/(4×b), Y=[(UR+UL)−(DR+DL)]/(4×a), and a and b are correction factors for correcting an aspect ratio of said lens module; and
    correcting a tilt phenomenon of said lens module according to said two-dimensional geometric tilt vector T(X,Y) so as to achieve a more uniform focusing effect of said optical image.

5. The focus adjustable method according to claim 4 wherein a=3 and b=4, or a=4 and b=3.

6. The focus adjustable method according to claim 4 further comprising steps of:
    performing a third image analysis procedure to obtain an image diagonal spinor D according to one of the formulas: D=(DR+UL)−(UR+DL) or D=(DR+UL)−(UR+DL)/4; and
    determining optical systematic errors of said lens module according to said image diagonal spinor D.

7. A focus adjustable system, for adjusting the focus of an optical lens module, comprising:
    a light source, for generating a light beam;
    a lens holding jag, having a receptacle for installing the optical lens module therein, the lens holding jag also having plural sustaining elements and an image sensor, wherein the lens module is sustained by the sustaining elements and the light beam is passed through the lens module and projected on the image sensor to generate an optical image;
    a microprocessor connecting to the lend holding jag, for calculating focus values UR, UL, DR and DL of said optical image at four corners respectively of the image,
    performing a first image analysis procedure to obtain a two-dimensional geometric tilt vector T(X,Y) according to the formulas: $T(X,Y)=(X^2+Y^2)^{1/2}$, ∠ arctan(Y/X), where X=[(DR+UR)−(UL+DL)]/b, Y=[(UR+UL)−(DR+DL)]/a, or X=[(DR+UR)−(UL+DL)]/(4×b), Y=[(UR+UL)−(DR+DL)]/(4×a) and a and b are correction factors for correcting an aspect ratio of the lens module, and
    correcting a tilt phenomenon of said lens module by controlling the sustaining force applied onto the sustaining elements according to said two-dimensional geometric tilt vector T(X,Y) so as to achieve a more uniform focusing effect of said optical image.

8. The focus adjustable system according to claim 7, wherein a=3 and b=4, or a=4 and b=3.

9. The focus adjustable system according to claim 8, wherein the microprocessor is also configured to:
    perform a second image analysis procedure to obtain an image diagonal spinor D according to one of the formulas: D=(DR+UL)−(UR+DL) or D=(DR+UL)−(UR+DL)/4; and
    determine optical systematic errors of said lens module according to said image diagonal spinor D.

10. The focus adjustable system according to claim 9, wherein the microprocessor is also configured to:
    perform a third image analysis procedure to obtain an image tetragonal average value M according to one of the formulas: M=(DR+UL+UR+DL) or M=(DR+UL+UR+DL)/4; and
    discriminate whether a focus value distribution of said optical image is optimized according to said image tetragonal average value M.

* * * * *

UNITED STATES PATENT AND TRADEMARK OFFICE
CERTIFICATE OF CORRECTION

PATENT NO.        : 7,634,183 B2                    Page 1 of 1
APPLICATION NO.  : 11/271363
DATED            : December 15, 2009
INVENTOR(S)      : Chin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 662 days.

Signed and Sealed this

Ninth Day of November, 2010

David J. Kappos
*Director of the United States Patent and Trademark Office*